United States Patent
Kablotsky

(10) Patent No.: US 7,457,960 B2
(45) Date of Patent: Nov. 25, 2008

(54) PROGRAMMABLE PROCESSOR SUPPORTING SECURE MODE

(75) Inventor: Joshua Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 674 days.

(21) Appl. No.: 10/999,656

(22) Filed: Nov. 30, 2004

(65) Prior Publication Data
US 2006/0130130 A1 Jun. 15, 2006

(51) Int. Cl.
H04L 9/00 (2006.01)

(52) U.S. Cl. .............................. 713/176; 726/9; 726/26; 713/189; 713/192; 713/194

(58) Field of Classification Search .................. 713/193, 713/192, 194, 176, 189; 726/9, 26
See application file for complete search history.

(56) References Cited

U.S. PATENT DOCUMENTS

| | | | | |
|---|---|---|---|---|
| 4,411,017 A * | 10/1983 | Talbot | ...................... | 380/31 |
| 4,555,805 A * | 11/1985 | Talbot | ...................... | 380/33 |
| 5,081,675 A * | 1/1992 | Kittirutsunetorn | .......... | 713/190 |
| 5,563,950 A * | 10/1996 | Easter et al. | ................. | 713/191 |
| 5,708,715 A * | 1/1998 | Vicard | ...................... | 713/191 |
| 5,799,086 A * | 8/1998 | Sudia | ...................... | 705/76 |
| 5,841,865 A * | 11/1998 | Sudia | ...................... | 380/286 |
| 5,850,451 A * | 12/1998 | Sudia | ...................... | 380/286 |
| 5,857,022 A * | 1/1999 | Sudia | ...................... | 713/173 |
| 5,872,849 A * | 2/1999 | Sudia | ...................... | 713/175 |
| 5,920,730 A * | 7/1999 | Vincent | ...................... | 710/14 |
| 5,970,143 A * | 10/1999 | Schneier et al. | ............. | 713/181 |
| 6,009,177 A * | 12/1999 | Sudia | ...................... | 713/191 |
| 6,331,812 B1 * | 12/2001 | Dawalibi | ...................... | 340/5.2 |
| 6,385,737 B1 * | 5/2002 | Benignus et al. | .............. | 714/22 |
| 6,445,606 B1 * | 9/2002 | Khoury | ...................... | 365/96 |
| 6,523,119 B2 * | 2/2003 | Pavlin et al. | ................. | 713/192 |
| 6,769,064 B2 * | 7/2004 | Sion et al. | ................... | 713/193 |
| 6,775,778 B1 * | 8/2004 | Laczko et al. | ............... | 713/194 |
| 7,024,564 B2 * | 4/2006 | Pavlin et al. | ................. | 713/192 |
| 7,124,170 B1 * | 10/2006 | Sibert | ...................... | 709/216 |
| 7,177,975 B2 * | 2/2007 | Toombs et al. | .............. | 711/103 |
| 7,203,844 B1 * | 4/2007 | Oxford | ...................... | 713/193 |
| 7,237,081 B2 * | 6/2007 | Dahan et al. | ................. | 711/163 |
| 7,302,585 B1 * | 11/2007 | Proudler et al. | ............. | 713/189 |
| 7,305,534 B2 * | 12/2007 | Watt et al. | ................... | 711/163 |
| 7,313,828 B2 * | 12/2007 | Holopainen | ................... | 726/29 |
| 7,363,511 B2 * | 4/2008 | Kiiveri | ...................... | 713/193 |
| 7,373,521 B1 * | 5/2008 | Kawahara | ................... | 713/193 |
| 7,373,657 B2 * | 5/2008 | Walker | ...................... | 726/4 |
| 2001/0034840 A1 * | 10/2001 | Sion et al. | ................... | 713/193 |
| 2001/0037450 A1 * | 11/2001 | Metlitski et al. | ............. | 713/152 |
| 2001/0050990 A1 * | 12/2001 | Sudia | ...................... | 380/286 |
| 2001/0056539 A1 * | 12/2001 | Pavlin et al. | ................. | 713/193 |
| 2002/0007456 A1 * | 1/2002 | Peinado et al. | ............... | 713/164 |

(Continued)

OTHER PUBLICATIONS

Menezes et al., Handbook of Applied Cryptography, 1996, CRC Press, chapters 1 and 11, pp. 1-48, 425-488.*

*Primary Examiner*—Nasser G Moazzami
*Assistant Examiner*—David Garcia Cervetti
(74) *Attorney, Agent, or Firm*—Gauthier & Connors LLP

(57) ABSTRACT

A processing system supporting a secure mode of operation is disclosed. The processing system includes a read-only hardware key that is only accessible in secure mode.

11 Claims, 4 Drawing Sheets

U.S. PATENT DOCUMENTS

| | | | |
|---|---|---|---|
| 2002/0129245 A1* | 9/2002 | Cassagnol et al. | 713/168 |
| 2003/0005322 A1* | 1/2003 | Kiiveri | 713/193 |
| 2003/0037237 A1* | 2/2003 | Abgrall et al. | 713/166 |
| 2003/0046566 A1* | 3/2003 | Holopainen | 713/193 |
| 2003/0046570 A1* | 3/2003 | Ronkka et al. | 713/193 |
| 2003/0093684 A1* | 5/2003 | Kaiserswerth et al. | 713/193 |
| 2003/0110388 A1* | 6/2003 | Pavlin et al. | 713/190 |
| 2003/0140205 A1* | 7/2003 | Dahan et al. | 711/163 |
| 2003/0140244 A1* | 7/2003 | Dahan et al. | 713/200 |
| 2003/0140245 A1* | 7/2003 | Dahan et al. | 713/200 |
| 2003/0191719 A1* | 10/2003 | Ginter et al. | 705/54 |
| 2003/0228911 A1* | 12/2003 | Dernis et al. | 463/43 |
| 2004/0025033 A1* | 2/2004 | Todd | 713/189 |
| 2004/0039924 A1* | 2/2004 | Baldwin et al. | 713/189 |
| 2004/0092310 A1* | 5/2004 | Brosnan et al. | 463/42 |
| 2004/0177261 A1* | 9/2004 | Watt et al. | 713/193 |
| 2004/0187019 A1* | 9/2004 | Nanki et al. | 713/200 |
| 2004/0210760 A1* | 10/2004 | McGrath et al. | 713/190 |
| 2004/0243783 A1* | 12/2004 | Ding et al. | 711/170 |
| 2005/0021968 A1* | 1/2005 | Zimmer et al. | 713/176 |
| 2005/0027997 A1* | 2/2005 | Ueno et al. | 713/193 |
| 2005/0182952 A1* | 8/2005 | Shinozaki | 713/189 |
| 2005/0278549 A1* | 12/2005 | Torla et al. | 713/189 |
| 2006/0059369 A1* | 3/2006 | Fayad et al. | 713/189 |
| 2006/0090081 A1* | 4/2006 | Baentsch et al. | 713/189 |
| 2006/0090084 A1* | 4/2006 | Buer | 713/189 |
| 2006/0105740 A1* | 5/2006 | Puranik | 455/410 |
| 2006/0117182 A1* | 6/2006 | Wolff | 713/176 |
| 2006/0129848 A1* | 6/2006 | Paksoy et al. | 713/193 |
| 2006/0177068 A1* | 8/2006 | Hatakeyama | 380/282 |
| 2006/0236125 A1* | 10/2006 | Sahita et al. | 713/193 |

\* cited by examiner

PROGRAMMABLE PROCESSOR SUPPORTING SECURE MODE

BACKGROUND OF THE INVENTION

The present invention generally relates to processing systems, and relates in particular to computer processing systems that support a secure mode of operation for executing a secure code and/or for processing secure data.

Certain processing systems provide a safe mode or a secure mode of operation in which a processor may be operated such that it may manipulate sensitive files and/or run secure algorithms that are highly sensitive. The access to such a secure mode, however, is sometimes difficult to safeguard. If a threat is able to obtain secure mode access, then substantial damage may result in certain applications. Software safeguards that protect access to a secure mode may be avoided if certain software data is obtained by a hacker. Hardware safeguards that protect access to a secure mode may involve the use of a secure boot sequence that employs a secure kernel that is separate from the primary operating system. Such a system, however, adds significant cost to the processor.

Security in processing is essential not only to avoid malignant code such as viruses from damaging the operation of the processor, but also to provide confidentiality of data within the processor and confidentiality in encrypting data that is to be transmitted to other processors.

There is a need, therefore, for a processor that provides a secure mode of operation in a reliable and economical processing system.

SUMMARY OF THE INVENTION

In accordance with an embodiment, the invention provides a processing system supporting a secure mode of operation and comprising a read-only hardware key that is only accessible in secure mode. In accordance with another embodiment, the invention provides a method of operating a processing unit in a secure mode. The method includes the steps of comparing an application signature in an application to be authenticated with a hardware key in the processing system, enabling an interrupt diversion routine to prevent interrupts from being received by the processor, disabling an emulation unit of the processor, and enabling a secure function to be executed.

BRIEF DESCRIPTION OF THE DRAWINGS

The following description may be further understood with reference to the accompanying drawing in which.

The drawings are shown for illustrative purposes.

DETAILED DESCRIPTION OF THE INVENTION

Figure 1:
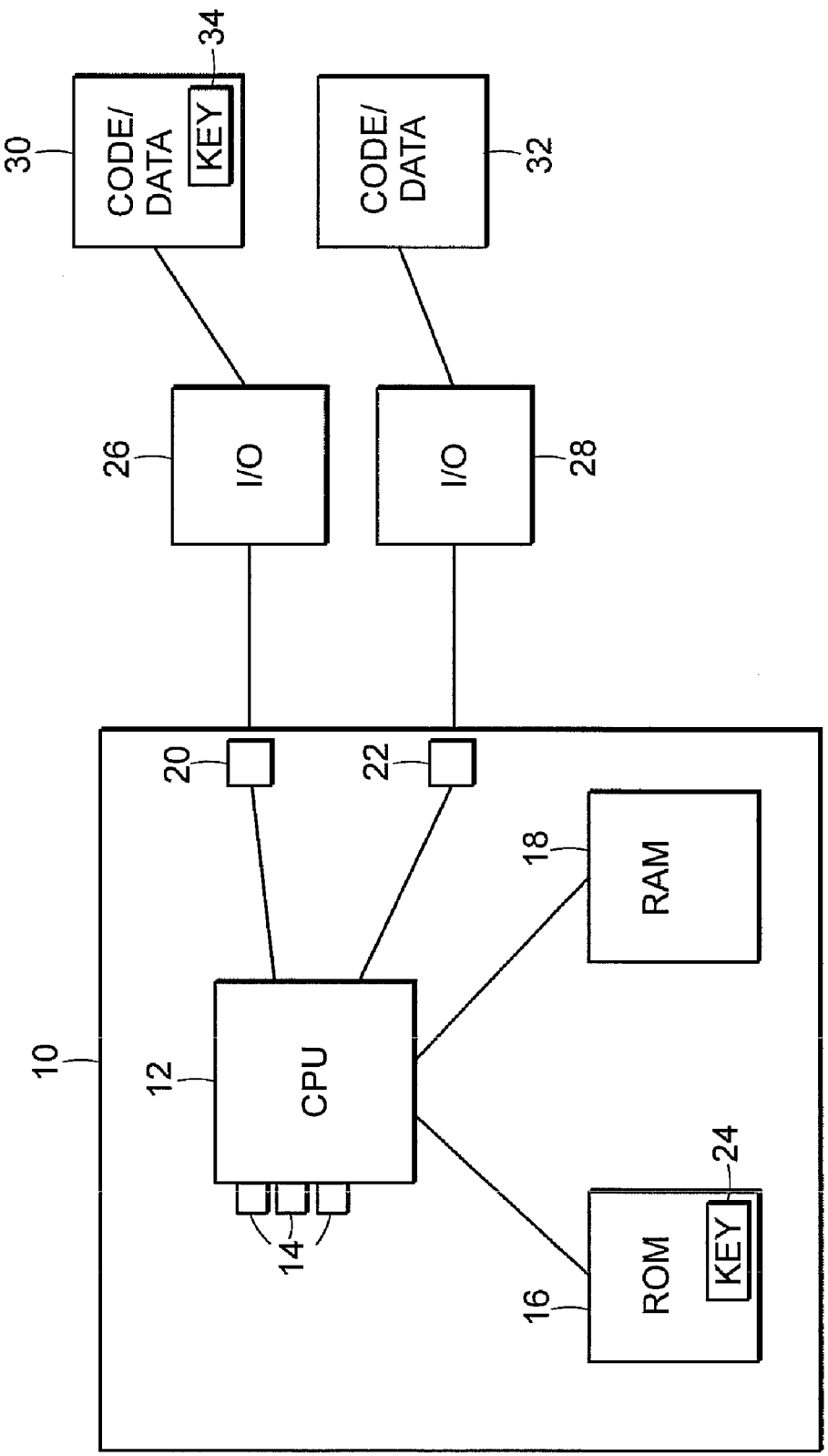
FIG. 1 shows a diagrammatic illustrative view of a plurality of processing systems in accordance with an embodiment of the invention.

As shown in FIG. 1, a processor 10 may include a central processing unit 12 that includes interrupt ports 14, a read only memory (ROM) 16, a random access memory (RAM) 18, and input/output ports 20 and 22 for communicating with input and/or output devices 26 and 28. The ROM 16 includes a hardware embedded key 24 that is provided by the manufacturer of the processing unit 10. This key is a private key that is embedded in the hardware of the device and is not available to be read except in secure mode. The private key may be, for example, about 256 bytes or 1024 bits long.

During use, various input/output devices 26 and 28 may communicate with the processor via the ports 20, 22. If any applications 30, 32 that are coupled to the devices 26 and 28 request operations in secure mode, then the system authenticates the requesting code by using public key authorization. The public key may, for example, be about 512 bytes or 2048 bits long. The key or keys on the device for this purpose are public. Code that has been authenticated has access to the key that may be used to decrypt subsequent code and data. The device key may depend on the protocol in use.

The key may be either embedded in the ROM or may be otherwise fixed in the hardware during manufacturing, or may involve the use of fuses or links to set the key. When operating in secure mode, all interrupts are vectored to a pre-interrupt handler to appropriately clear the state of the machine. In other embodiments, an alternate interrupt vector table may be used as discussed below. The move to secure mode is possible under software control, but only after the requesting software has been authenticated. Authentication is achieved by passing a pointer and a byte count to the authentication-request subroutine placed in the ROM device. The key may be embedded in the ROM 16 or may be provided in a set of fuse-type links within the processor.

Figure 2:
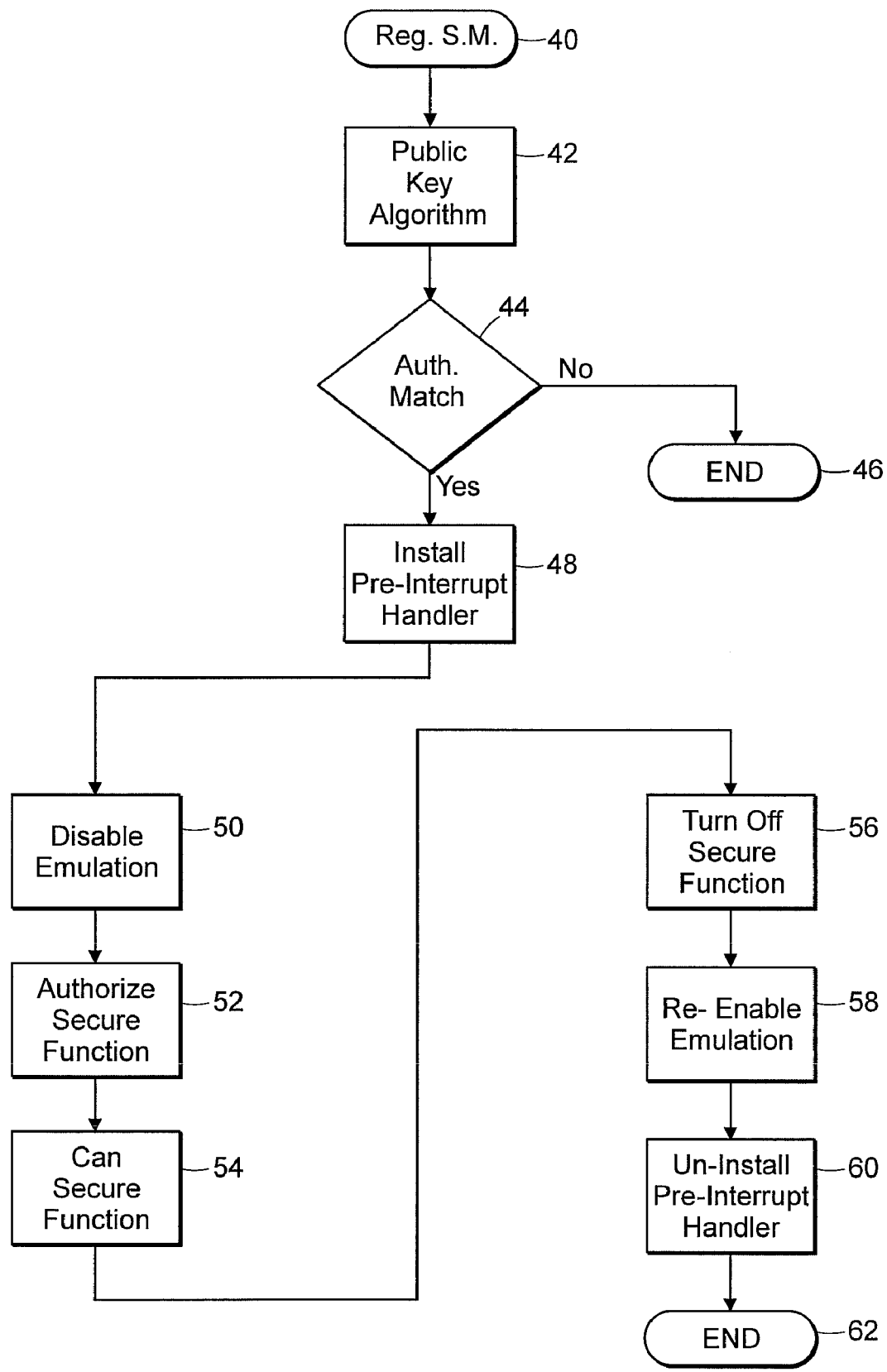
FIG. 2 shows a diagrammatic flowchart of the operational steps performed by a system in accordance with an embodiment of the invention.

With reference to FIG. 2, the authentication request subroutine begins with a request for secure mode (step 40) and uses a public key signature algorithm (step 42) to verify the source and integrity of the code requesting secure mode (step 44). The signature is generated using a private key, and it is validated using the public key. Once validated, secure mode is enabled and the hidden key becomes visible. An authentication request may be made either by a direct function call to a known and fixed address, or by a system call that loads registers with parameters that are passed, which causes a software exception to occur. The authentication request may, for example, vector to an authentication code in registers or a data structure in fixed hardware memory, or may call a coded location. If the signature does not match, the routine ends (step 46). If the signature matches, the authenticated function would then install a pre-interrupt handler (step 48), and then disable emulation capability (step 50). The authenticated function would put the hardware into secure mode (step 52) and then make an indirect call to the requested, authenticated function (step 54). Once in secure mode, this key becomes visible. This key could then be used by the authenticated function to decrypt and call subsequent code, to decrypt other data, or as a seed for generating private keys. The algorithm used may, for example, take advantage of the secret nature of this hardware key to use public/private key encryption for the code.

Prior to leaving secure mode, the authenticated function should clear the machine of any sensitive state and code before ending. In particular, the function should turn off the secure function (step 56), re-enable emulation (step 58), and un-install the pre-interrupt handler (step 60) prior to ending (step 62). The authenticated function may wish to use a subset of the hardware key to create a device key or ID that is useful in establishing secure communications with other devices. Alternatively, the device key used for communication may be stored in an encrypted fashion in the software.

Figure 3:
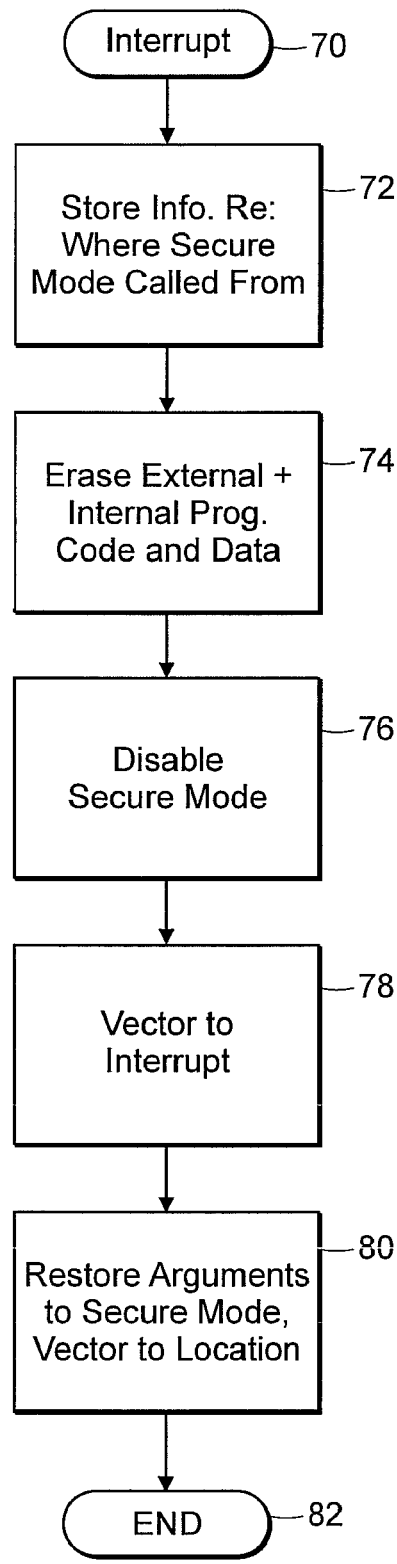
FIG. 3 shows a diagrammatic flowchart of the operational steps involved in the operation of a pre-interrupt handler in accordance with an embodiment of the invention.

As shown in FIG. 3, an interrupt routine may be handled (step 70) by first storing information regarding where the secure mode was called from (step 72). The routine then erases all sensitive or secure external and internal programming code and data (step 74). The routine then disables secure mode (step 76), and vectors to the requested interrupt (step 78). The routine then restores any arguments to secure mode and vectors to that location (step 80) before ending (step 82). In other embodiments, the system may not return to exactly the same place from where the requested code was called. For example, if the interrupt service routine is aware of what the secure code is doing, and is able to determine that some useful work was done, it may then continue the secure work approximately where it left off before the interrupt was received.

Figure 4:
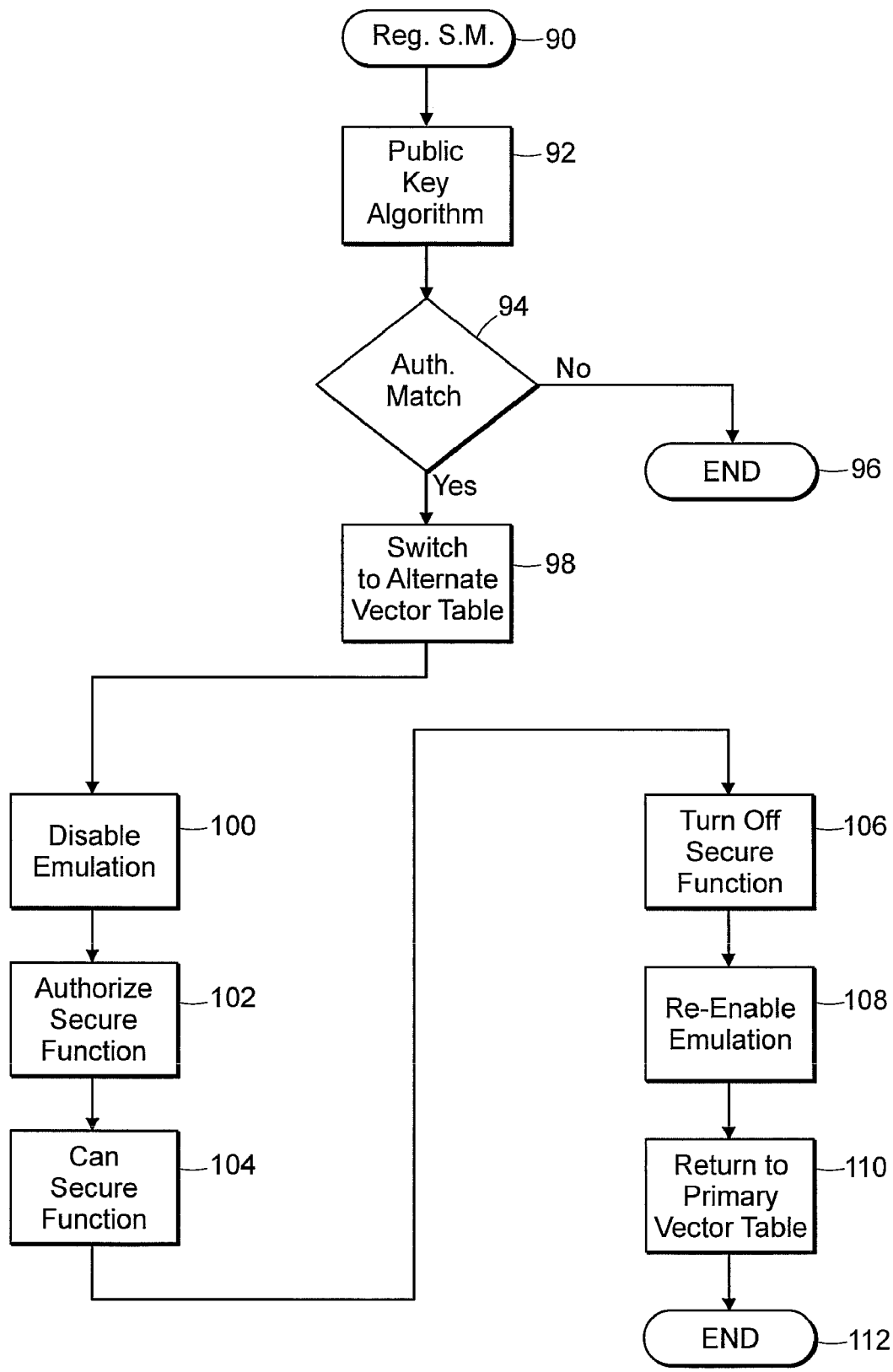
FIG. 4 shows a diagrammatic flowchart of the operational steps performed by a system in accordance with another embodiment of the invention.

In accordance with yet another embodiment, and with reference to FIG. 4, an authentication request subroutine begins with a request for secure mode (step 90) and uses a public key signature algorithm (step 92) to verify the source and integrity of the code requesting secure mode (step 94). The authentication request may, for example, vector to an authentication code in registers or a data structure in fixed hardware memory, or may call a coded location. If the signature does not match, the routine ends (step 96). If the signature matches, the authenticated function would then switch to an alternate interrupt table (step 98), and then disable emulation capability (step 100). The authenticated function would put the hardware into secure mode (step 102) and then make an indirect call to the requested, authenticated function (step 104). Once in secure mode, this key becomes visible. This key could then also be used by the authenticated function to decrypt and call subsequent code to decrypt other data, or as a seed for generating private keys. Again, the algorithm used may take advantage of the secret nature of this hardware key to use public/private key encryption for the code.

Prior to leaving secure mode, the authenticated function should clear the machine of any sensitive state and code before ending. In particular, the function should turn off the secure function (step 106), re-enable emulation (step 108), and return to using the primary interrupt table (step 110) prior to ending (step 112). Again, the authenticated function may wish to use a subset of the hardware key to create a device key or ID that is useful in establishing secure communications with other devices. Alternatively, the device key used for communication may be stored in an encrypted fashion in the software.

The alternate interrupt vector table may include a list of addresses to interrupt service routines in accordance with an embodiment, or may include several bytes that may contain either an interrupt service routine itself (for example if the routine is short), or may include a jump instruction to a relative or absolute address. Any of the bits of an address (e.g., 14 bits ) as well as any of the bytes that include a jump instruction may also include instructions for the routine that was called by the interrupt.

Systems of the invention provide, therefore, that a signature may be generated with a private key that can be verified with a public key. The signature itself is not verified, but rather it is the combination of the message and the signature that is verified. The signature is similar to a one-way hash of the content of the message, in that the message cannot be generated from the hash, and only the hashing function can produce the signature. There is a comparable function that together can hash the message with its signature so if the public key is present, then the signature may be verified. If the public key pair of that private key is present, then that signature may be verified as being is correct for that message. The system verifies that that private key was used to sign that message.

The system, therefore, performs two basic functions; one is authentication, and the other is providing access to the private hardware key. The authentication code includes a public key. The public code uses that public key to verify the authenticity of code requesting secure mode. Once authenticated, access to secure mode is provided which gives the device access to additional hardware features, including the hardware key itself. The system may then permit the requesting device to perform a wide variety of functions. For example, if the requesting device included additional code that was encrypted, the system could not decrypt the code without knowing the private hardware key. The encryption, may for example, employ a public key encryption technology such as sold by PGP Corporation of Palo Alto, Calif., or symmetric key, cryptography, where the exact same key was used in encryption, and unless the receiver has the exact same key the receiver cannot decrypt the code. In further embodiments, access to the secure mode may be used to generate a unique device identifier, for example, wherein the hardware key itself could be the unique device identifier. Access to secure mode also permits one to create subsequent keys. Further, to the extent that the resource of secure mode is unique for each chip, further uses are provided that are unique to each user of each such system.

Those skilled in the art will appreciate that numerous modifications and variations may be made to the above disclosed embodiments without departing from the spirit and scope of the invention.

What is claimed is:

1. A processing system supporting a secure mode of operation, said processing system comprising:
   a read only memory that includes a read only hardware key;
   authentication means for using a public key to authenticate a signature of code requesting access to secure mode; and
   secure access means for permitting a region of memory to be accessible to the processor only after the signature of code requesting access to secure mode is authenticated.

2. The processing system as claimed in claim 1, wherein said processing system further includes interrupt diversion enabling means for enabling an interrupt diversion routine to prevent interrupts from being received by the processor.

3. The processing system as claimed in claim 2, wherein said interrupt diversion enabling means includes pre-interrupt handler means for installing a pre-interrupt handler.

4. The processing system as claimed in claim 2, wherein said processing system includes a primary interrupt vector table for use during operation of the processing system outside of secure mode, and said interrupt diversion handling means includes alternate interrupt vector table means for installing an alternate interrupt vector table for use during the secure mode of operation.

5. The processing system as claimed in claim 4, wherein said alternate interrupt vector table includes a list of addresses of interrupt service routines.

6. The processing system as claimed in claim 4, wherein said alternate interrupt vector table includes interrupt service routines.

7. The processing system as claimed in claim 4, wherein said alternate interrupt vector table includes jump instructions to interrupt service routines.

8. A method of changing a mode of operation of a processing unit from a non-secure mode to a secure mode, said method comprising the steps of:

- authenticating a section of code requesting secure mode access by evaluation of its signature using a hardware key in the processing unit;
- enabling an interrupt diversion routine in the processing unit to prevent interrupts from being received by the processing unit;
- disabling an emulation unit of the processing unit; and
- enabling a secure function to be executed during operation.

9. The method as claimed in claim 8, wherein said step of enabling an interrupt diversion routine to prevent interrupts from being received by the processing unit involves installing a pre-interrupt handler.

10. The method as claimed in claim 8, wherein said step of enabling an interrupt diversion routine to prevent interrupts from being received by the processing unit involves installing an alternate interrupt vector table.

11. The method as claimed in claim 8, wherein said method further involves the step of clearing any sensitive code prior to exiting the secure mode.

* * * * *